Patented Aug. 20, 1940

2,212,029

UNITED STATES PATENT OFFICE 2,212,029

DYESTUFFS OF THE ANTHRAQUINONE SERIES

Ralph N. Lulek, Silverside Heights, Del., assignor to E. I. du Pont de Nemours & Company, Wilmington, Del., a corporation of Delaware No Drawing. Application October 21, 1938, Serial No. 236,305

4 Claims. (Cl. 260—274)

The invention relates to the preparation of new dyestuffs prepared from benzanthronyl-aminoanthraquinone compounds which dye cotton in olive to olive gray shades.

In U. S. Patent No. 995,936 dyestuffs are described which are prepared by the condensation of Bz-1-benzanthrone with 1-aminoanthraquinone, and fusion of the condensation product with caustic alkali. The resulting dyestuff is considered as having the formula:

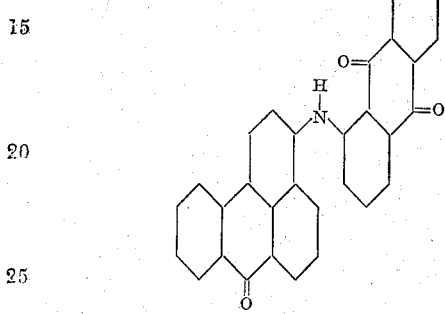

This product dyes cotton in exceedingly fast green shades.

Because of the fastness properties of the dyestuffs of U. S. Patent No. 995,936 many new dyestuffs have been produced by further substitution of this molecule. I have now found that new and very desirable olive to olive-gray dyestuffs may be produced when the benzanthronyl-1-aminoanthraquinone of U. S. Patent No. 995,936 which contains halogen in one or both of the positions 6 and 6′ is fused with caustic alkali under the normal fusion conditions whereby the halogen is completely eliminated from the final dyestuff. Because of the presence of the extraneous halogen in the molecule a somewhat different molecular condensation apparently takes place during the alkali fusion giving dyestuffs that have excellent fastness properties and which are particularly useful as components in the preparation of the olive drab and khaki shades.

The following examples are given to illustrate the invention, in which the parts used are by weight.

Example 1

25 parts of 1-(6′-bromo-Bz-1′-benzanthronyl) amino-anthraquinone of the formula

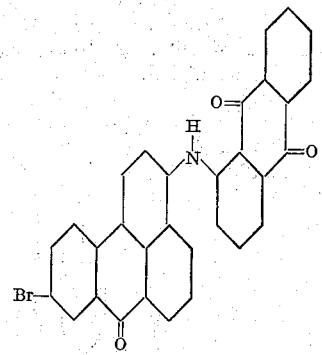

(obtained by condensing one mol of 6-Bz-1-dibromobenzanthrone with one mol of 1-aminoanthraquinone at 200 to 205° C. in the presence of a copper salt and an acid binder such as sodium carbonate in a high boiling organic solvent such as nitrobenzene in the usual manner) are fused with 125 parts of caustic potash and 62 parts methyl alcohol at 140 to 145° C. for from one to one and one-half hours. The mass is drowned in water and precipitated by boiling and simultaneous aerating. The precipitated dyestuff is filtered hot, washed free of alkali and dried. It dissolves in concentrated sulfuric acid with a green color and dyes cotton from a violet vat in olive shades of exceptional fastness properties. This dyestuff does not contain halogen.

Example 2

25 parts of 1(6'-bromo-Bz-1'-benzanthronyl)amino-6-chloroanthraquinone of the formula

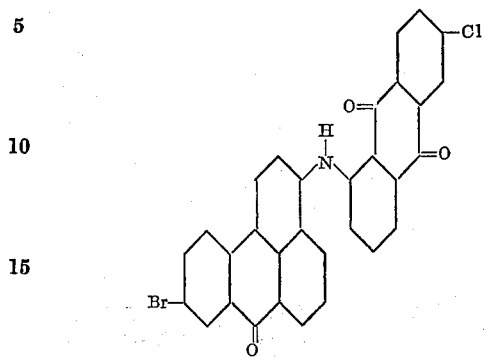

(obtained by condensation of one mol of 6-Bz-1-dibromobenzanthrone with one mol of 1-amino-6-chloroanthraquinone by the process described in Example 1) are fused with 125 parts caustic potash and 65 parts methyl alcohol at 145 to 150° C. for one hour. The fusion mass is drowned in water and the dyestuff isolated by aerating, filtering and washing with hot water. When dry it is a dark powder soluble in concentrated sulfuric acid with green color and dyes cotton from a violet vat in olive gray shades of good fastness properties.

Although in the above examples a 6-bromo-compound is employed it is to be understood that the corresponding chlorine compounds may be used. Where the chlorine compounds are employed a dyestuff is obtained which dyes in more neutral shades of gray than where the 6-bromo-compound is used. Where the caustic fusion of these 6 halogen containing benzanthronylaminoanthraquinones is carried out under the conditions normally employed in the fusion of the benzanthronylaminoanthraquinone, no material amount of halogen remains in the resulting dyestuff, and it is only when the fusion is so carried out that the desired olive to olive gray dyes of this invention are obtained.

I claim:

1. The process for preparing olive to olive gray dyestuffs which comprise fusing a compound of the general formula

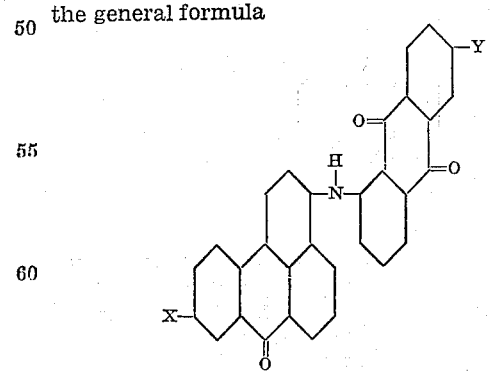

in which Y stands for an element of the class consisting of hydrogen, chlorine and bromine and X stands for a halogen of the class consisting of chlorine and bromine with alcoholic caustic until the resulting product is converted to dyestuff and is substantially free from halogen.

2. The olive to olive gray dyestuffs which are obtained by the alkali fusion of the compounds having the formula

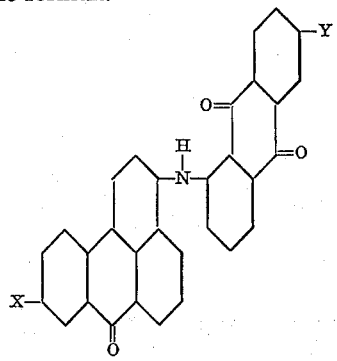

in which Y stands for an element of the class consisting of hydrogen, chlorine and bromine and X stands for a halogen of the class consisting of chlorine and bromine, said fusion having been carried out under conditions which removes substantially all of the halogen from said compounds.

3. The dyestuff which is obtained by the alkali fusion of the compound

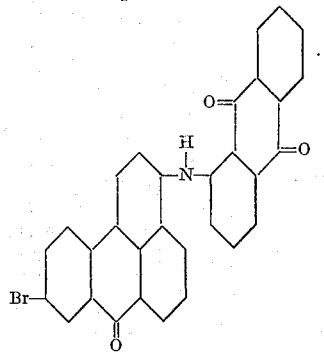

which dyestuff dyes cotton from a violet vat in olive shades of excellent fastness properties, said fusion having been carried out under conditions which removes substantially all of the bromine from said compound.

4. The dyestuff which is obtained by the alkali fusion of the compound

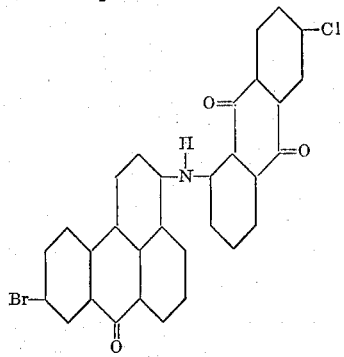

which dyestuff dyes cotton from a violet vat in olive gray shades of excellent fastness properties, said fusion having been carried out under conditions which removes substantially all of the halogen from said compound.

RALPH N. LULEK.

Certificate of Correction

August 20, 1940.

Patent No. 2,212,029.

RALPH N. LULEK

It is hereby certified that error appears in the printed specification of the above numbered patent requiring correction as follows: Page 1, first column, lines 13 to 26 inclusive, the formula should appear as shown below instead of as in the patent—

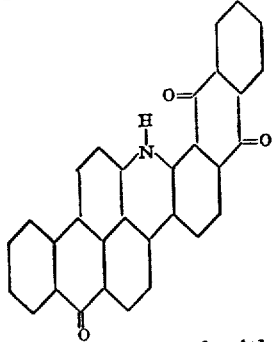

and that the said Letters Patent should be read with this correction therein that the same may conform to the record of the case in the Patent Office.

Signed and sealed this 10th day of August, A. D. 1943.

[SEAL]

HENRY VAN ARSDALE,
*Acting Commissioner of Patents.*